UNITED STATES PATENT OFFICE.

SAMUEL J. HOGGSON, OF NEW HAVEN, CONNECTICUT.

COMPOUND FOR PRESERVING FRUIT.

SPECIFICATION forming part of Letters Patent No. 367,632, dated August 2, 1887.

Application filed November 8, 1886. Serial No. 218,311. (No specimens.)

*To all whom it may concern:*

Be it known that I, SAMUEL J. HOGGSON, of New Haven, in the county of New Haven and State of Connecticut, have invented a new Improvement in Preserving and Packing Oranges and Similar Fruit; and I do hereby declare the following to be a full, clear, and exact description of the same.

This invention relates to the treatment of oranges and similar fruits preparatory for market, having for its object to prevent the decay of the fruit.

The rind of the orange consists of a thin exterior layer abounding in vesicles filled with a fragrant volatile oil, and having an anterior one, which is a thick white fungus, insipid and inodorous, destitute of activity, and by its affinity for moisture renders the rind liable to become moldy, thus destroying the natural chemical combination, and forming a spontaneous fermentation with the saccharine juices of the fruit. This may be expected when the fruit is exposed unprotected to common temperatures, as this putrefactive fermentation is occasioned by a certain degree of heat and moisture, developing a microscopic fungus growth, called *torula aceti*. This will always occur when the anterior or inner layer of the rind becomes saturated with atmospheric moisture, and to prevent this is the object of my invention. The ingredients which I employ may be used in several ways, and in treating the one hundred and sixty-nine varieties of the orange described by Risso there is much room for a successful modification of the proportions. I will describe one of the ways of using the ingredients employed in my process that I have found to be simple and successful. Any suitable form of vessel will answer the purpose, but I prefer one made of galvanized iron. I also employ a dipping-basket, which is best made from galvanized wire. In a vessel I place, say, four pounds of gelatine, adding cold water sufficient to thoroughly cover it. This I permit to stand twelve hours, or more. In the meantime I prepare a sulphur sirup. This may be done by the use of a sand bath, or otherwise, by boiling two ounces of sulphur in sixteen ounces of vegetable oil, by preference olive-oil. When the sirup is prepared, and before it is quite cold, I add to it six ounces of aqua-ammonia, thus converting the sulphur sirup into a saponule compound, to which I add one ounce of bichromate of potassa and one ounce of alum, both of which have been previously dissolved in warm water. When the gelatine has stood sufficiently long, as before described, to readily dissolve by applying heat to the vessel containing it, I add four pounds of (by preference) glycerine, but may be sugar, molasses, or other saccharine matter, and thoroughly mix, and when the gelatine and glycerine or other saccharine matter is thoroughly combined and of an even consistency I add (constantly stirring) the saponule compound, and by continuing the heat the ammoniacal gas is readily dissipated by evaporation, thus leaving the sulphur and olive-oil blended in the compound. If the solution is too thick, I reduce it with warm water to the proper consistency. Some exercise of judgment is here necessary. The consistency should be such as to be readily applied to the surface of the fruit. The gelatine in this solution will not congeal on cooling, and may be used either hot or cold. If used cold, a trace of oil of mustard may be added to advantage; but I prefer to use it warm, say from 100° to 120° Fahrenheit. The fruit is placed in the basket and dipped into the bath, and should be turned or moved in the bath, so that every portion of the fruit will be brought into contact with the preserving compound. As the inner rind of the orange is not a conductor of heat, the fruit may be left in the compound a sufficient length of time—say five to eight seconds—to warm the outer rind, which will therefore take a more uniform coating. After thus subjecting the fruit to the bath it may be poured out of the basket onto a suitable tray to dry. This treatment of the fruit should be performed in clear dry weather, and after treatment the fruit should be exposed to the light and air until dry. Then they will be found to be inclosed in an elastic air-tight water-proof covering, and are ready to pack. The cost of this covering will not exceed the cost of the paper wrapper commonly used in packing this class of fruit.

In order that those using this compound may more fully understand its nature and action, it may be proper for me to explain that the glycerine and gelatine form an elastic compound. The bichromate of potassa by the action of light renders the gelatine insoluble and impervious to moisture, and the vegetable oil further insures this quality of the compound, although introduced as a solvent for the sulphur. The glycerine assimilates with the volatile oil of the orange, conveying the sulphur with it, which prevents spontaneous fermentation. The alum dries the outer layer of the rind, thus closing the pores, sealing up that lively aromatic flavor, and imparting a quality value not otherwise attainable in this class of fruit exposed to spontaneous decomposition.

Fruits preserved by this process have their constituent elements stayed by a cessation of the laws of nature.

The sulphur may be added directly to the gelatine compound, or it may be applied as a powder to the outside of the fruit after it is coated and nearly dry; but I prefer to use it as herein specified, as in this way the compound enhances the appearance of the fruit to both sight and touch.

As the bichromate of potassa is used to exclude moisture, it may be omitted when such exclusion of moisture is not essential.

From what I have stated it will be evident to those skilled in the art to which this invention pertains that the proportions of the ingredients may be varied to a considerable extent without departing from my invention. I therefore wish it distinctly understood that I do not limit myself to any particular proportions of the ingredients herein specified.

I claim—

The herein-described compound for preserving oranges and kindred fruit, consisting of gelatine, saccharine matter, oil, sulphur, and alum, in the proportions and substantially as described.

SAMUEL J. HOGGSON.

Witnesses:
JOHN E. EARLE,
LILLIAN D. KELSEY.